(No Model.)
F. E. YOUNGS.
PERMANENT PIPE COUPLING.
No. 326,469. Patented Sept. 15, 1885.
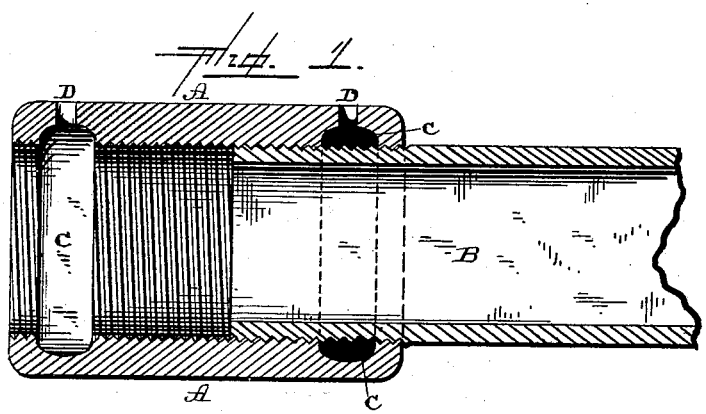
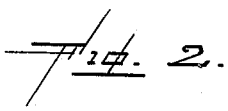
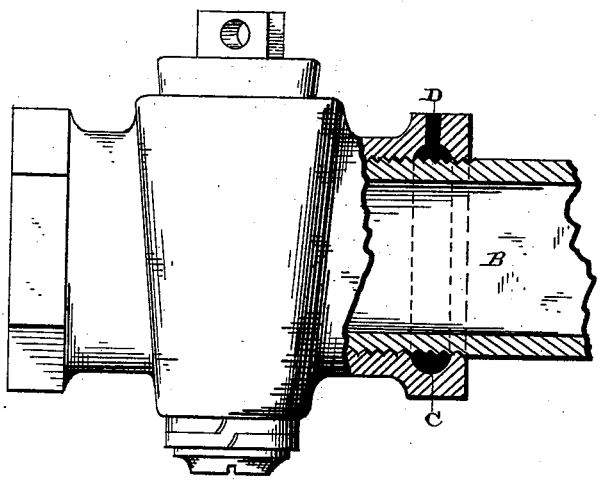
Witnesses.
Louis F. Gardner
J. E. Prosperi.
Inventor.
Fred. E. Youngs,
per J. A. Lehmann,
atty.

UNITED STATES PATENT OFFICE.

FRED E. YOUNGS, OF ALLEGHENY, PENNSYLVANIA.

PERMANENT PIPE-COUPLING.

SPECIFICATION forming part of Letters Patent No. 326,469, dated September 15, 1885.

Application filed February 12, 1885. (No model.)

*To all whom it may concern:*

Be it known that I, FRED E. YOUNGS, of Allegheny, in the county of Allegheny and State of Pennsylvania, have invented certain new and useful Improvements in Permanent Pipe-Couplings; and I do hereby declare the following to be a full, clear, and exact description of the invention, such as will enable others skilled in the art to which it pertains to make and use it, reference being had to the accompanying drawings, which form part of this specification.

My invention relates to improvement in permanent pipe-couplings; and it consists, first, in the process of forming a tight joint wherever a screw coupling or connection is made, consisting in first covering the thread or threads with a thin coating or plating of solder that fuses at a low temperature, and then screwing the two parts together with sufficient force to generate enough heat to melt the solder, or applying heat to the outer sides of the pipes to melt the solder and thus unite the two threaded surfaces together; second, in the combination of the two threaded ends of the pipes with the threaded coupling, of any suitable form, having sockets or recesses formed in its inner surface at suitable points, and into which sockets is poured a solder or composition, and which fills the space around the threaded end of the pipe in such a manner as to form an absolutely-tight joint, as will be more fully described hereinafter.

Figure 1 is a vertical longitudinal section of a coupling embodying my invention. Fig. 2 shows my invention as applied to a valve of any kind.

A represents a coupling, either of the form here shown or any other that may be preferred, and B a pipe having a screw-thread formed on its end in the usual manner.

In the inner surface of the coupling A, within a short distance of its ends, are formed the recesses C, which are to be filled with lead, a suitable composition, or solder of any kind through the holes D after the pipes B have been screwed into position.

In order to form a joint that is absolutely steam, gas, and air tight under all possible circumstances, the end of the pipe and the coupling are first cleaned in the usual manner, and then either one or both are dipped in a solder that fuses at a low heat, so as to plate or cover the screw-threads with a thin coating of the solder. Where the pipes are large the force exerted in screwing them into the couplings usually generates sufficient heat to melt this solder and thus unite the two threaded surfaces together. In case the pipes are small or not enough heat is generated in screwing them together heat is to be applied to the outer surface of the coupling, so as to melt the solder.

In order to increase the safety of the joint after the pipes have been united, as above described, the recesses C are filled with a solder or composition of any kind, but preferably with one which expands as it cools and thus fills the recesses around the threaded ends of the pipes in such a manner that no leakage can possibly take place. These recesses may be formed in valves, as shown in Fig. 2, or in any other place where a screw-joint is to be formed, and used either alone or in addition to the soldered threads.

The inner surface of the recess C being tinned, and the surface of the threads being tinned, the solder or composition unites with the tinned surfaces, and as the solder expands in cooling, the solder is made more dense and freer from blow-holes.

The pipe itself may have a recess formed in its threaded surface, or both the pipe and the coupling may have a portion of the screw-threads removed and the recess thus be formed in both parts. In filling the recess C it will be found preferable to cast the solder under pressure to increase the density and decrease the number and size of blow-holes.

Having thus described my invention, I claim—

1. The combination of the coupling and the pipe connected thereto, the thread of one or both of the parts being covered with a solder that fuses at a low temperature, and the threaded surfaces solidly joined by means of the interposed metal, substantially as shown.

2. In a pipe-coupling, the combination of the coupling and pipe, one or both of which have their screw-threads covered with a solder that fuses at a low temperature, so that the two opposing screw-threaded surfaces are solidly joined together by the fusible metal that is interposed between the threads, the coupling being provided with a recess, C, which is filled with solder, lead, or other suitable composition, substantially as set forth.

In testimony whereof I affix my signature in presence of two witnesses.

F. E. YOUNGS.

Witnesses:
F. A. LEHMANN,
J. E. PROSPERI.